June 9, 1925.
J. M. SARGEANT
LAMP HEATER
Filed April 19, 1924
1,541,283
2 Sheets-Sheet 1
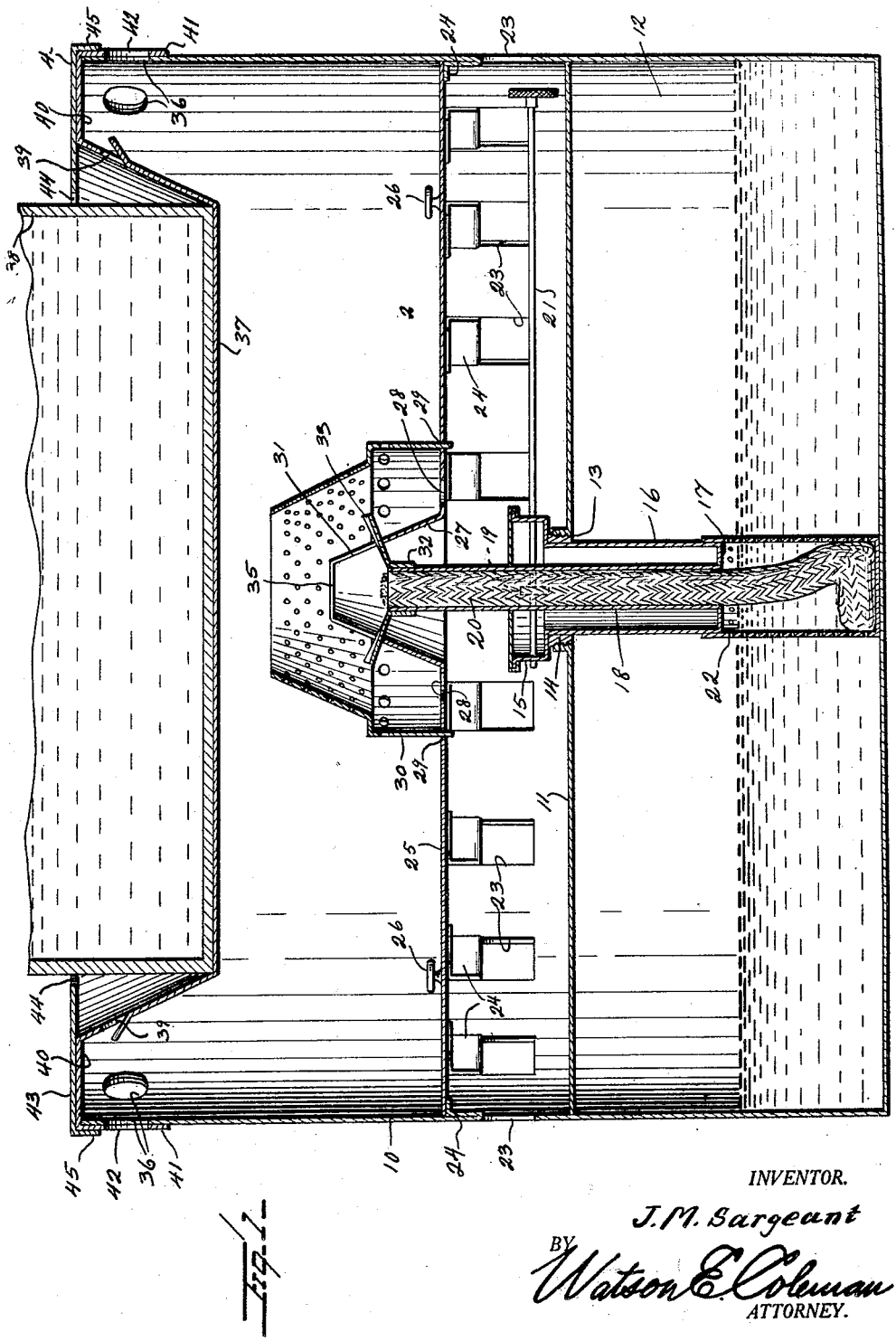
INVENTOR.
J. M. Sargeant
BY Watson E. Coleman
ATTORNEY.

June 9, 1925. 1,541,283
J. M. SARGEANT
LAMP HEATER
Filed April 19, 1924 2 Sheets-Sheet 2
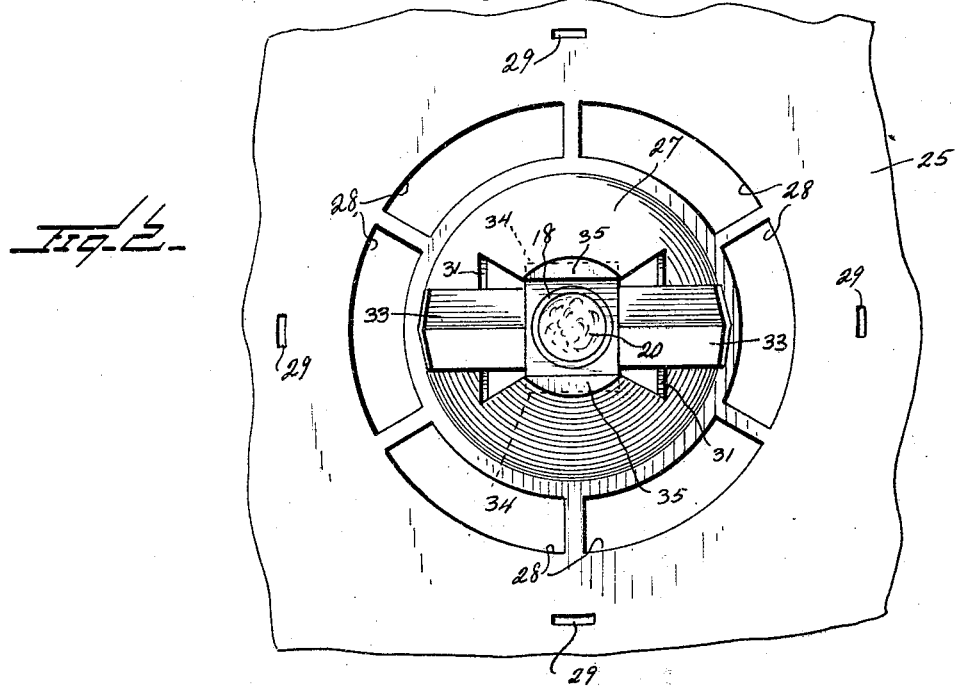
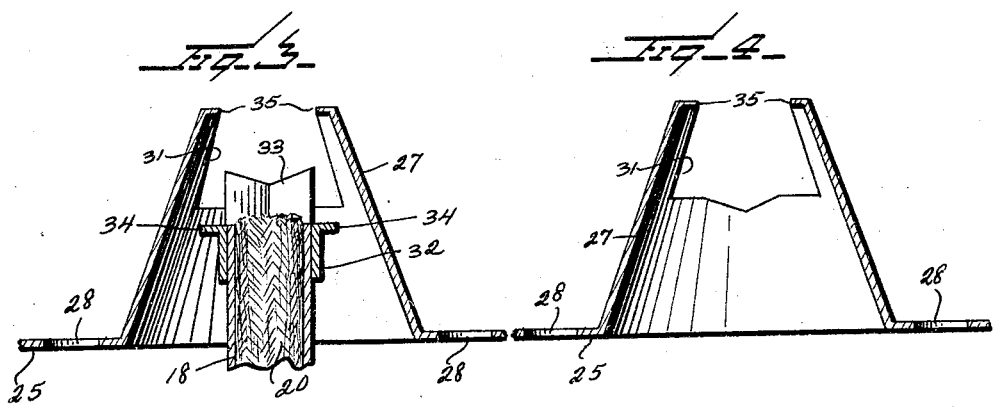
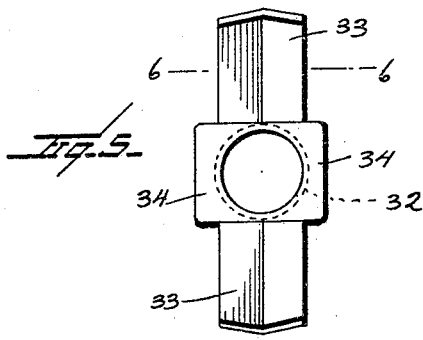
INVENTOR.
J. M. Sargeant
BY Watson E. Coleman
ATTORNEY.

Patented June 9, 1925.

1,541,283

UNITED STATES PATENT OFFICE.

JOHN M. SARGEANT, OF ELMIRA, NEW YORK.

LAMP HEATER.

Application filed April 19, 1924. Serial No. 707,712.

*To all whom it may concern:*

Be it known that I, JOHN M. SARGEANT, a citizen of the United States, residing at Elmira, in the county of Chemung and State of New York, have invented certain new and useful Improvements in Lamp Heaters, of which the following is a specification, reference being had to the accompanying drawings.

This invention relates to lamp heaters and more particularly to a heater for heating drinking water or the like for poultry.

An important object of the invention is to provide a device of this character which is very readily regulated and which may be cheaply and readily produced and at the same time provide an efficient burner.

A further object of the invention is to provide a lamp construction in which the burner dome, instead of being directly attached to or carried by the filling cap and wick tube, is supported above the filling cap so that the wick tube projects therein, the support for the burner dome comprising a baffle plate substantially paralleling the upper surface of the oil reservoir of the lamp and forming a conduit for delivering air to the burner.

A still further object of the invention is to provide a lamp casing so constructed that it provides supports for a baffle plate of this construction in the formation of the openings to admit air to the burner cap.

A still further object of the invention is to provide a burner of this character having a support for a vessel arranged above the burner, the side wall of the burner casing and the support having coacting openings determining the amount of the product of combustion which may pass through the side walls, the support having other openings for delivering the products of combustion against the sides of a vessel supported thereby.

A further object of the invention is to provide a device of this character in which the support for the vessel or container to be heated has a cap constructed to direct the products of combustion against the side walls of the container.

These and other objects I attain by the construction shown in the accompanying drawings, wherein for the purpose of illustration is shown a preferred embodiment of my invention and wherein:—

Figure 1 is a vertical sectional view taken through a lamp heater constructed in accordance with my invention;

Figure 2 is an enlarged plan view of the central portion of the baffle plate showing the burner in position therebelow;

Figure 3 is an enlarged vertical sectional view at right angles to the view shown in Figure 1, showing the construction of the burner dome;

Figure 4 is a similar view, the wick tube and flame spreader being removed;

Figure 5 is a plan view of the wick spreader;

Figure 6 is a section on the line 6—6 of Figure 5.

Referring now more particularly to the drawings, the numeral 10 generally indicates an open top casing which is provided in spaced relation to its lower end with a horizontal partition 11 forming in the lower end of the casing an oil chamber or reservoir 12. The numeral 13 designates a filling opening for the reservoir 12 having the usual threaded flange for coaction with the threads of a removable filling cap 14. This filling cap is provided with an upwardly directed flange 15, the purpose of which will presently appear, and a downwardly directed flange 16 extending well into the compartment 12. The lower end of this downwardly directed flange is in turn provided with a horizontal inwardly directed flange 17 having a central opening receiving the lower end of a wick tube 18 which is secured to this horizontal flange 17. The wick tube 18 has its upper end extended well above the upper end of the flange 15 and is provided in its side wall with a slot through which is directed the usual toothed wheel 19 for shifting the wick 20, this toothed wheel being operated by a shaft 21 directed through the vertically extending flange 15 of the cap. The lower end of the wick 20 is preferably housed within a perforated container 22 the upper end of which is engaged with the lower end of the flange 16 to be supported thereby. The perforations of this container 22 are of such size that the wick cannot escape therefrom.

Formed in the side walls of the container 10, immediately above the horizontal partition 11, is a series of circumferentially spaced openings 23, the metal displaced in forming the opening being struck inwardly and left attached at the upper edge of the opening to provide tabs 24 for the support of a baffle plate 25. This plate is provided with handles whereby it may be removed, as at 26, and has struck upwardly therefrom, immediately above the burner cap 14, a burner dome 27 into which the upper end of the wick tube 18 projects. About the burner dome the baffle plate is provided with a circular series of openings 28 and arranged outwardly of these openings from the dome 27 a second series of openings 29. This last series of openings receives lugs formed upon the lower end of a perforated chimney 30, the openings 28 admitting air to the space between this chimney and the burner dome.

The burner dome is of the usual construction with the exception of the fact that the slot 31 thereof is widened at its lower ends which extend downwardly into the side walls of the dome. Mounted upon the upper end of the wick tube is a short sleeve 32 having extending outwardly and upwardly therefrom at opposite sides thereof a pair of wings 33 which rest in the lower ends of the slot. These wings, in addition to inclining upwardly and outwardly, are V-shaped in cross section. Extending outwardly at right angles to the wings 33 are a pair of flanges 34 which extend into proximity with the walls of the dome and direct air passing upwardly through the dome against the inner wall of the dome by which it is directed in leaving the overhanging lips 35 of the dome substantially horizontally against the flame arising from the wick 20. The structure 32, 33, 34 combines a flame spreader in combination with a circular wick and will form a flat narrow band of flame such as is ordinarily provided by a flat wick.

The upper edge of the side walls of the casing is provided with a row of circumferentially spaced openings 36. The numeral 37 designates a support for a container generally indicated at 38. This support is in the form of a dished receptacle having formed in its side wall openings 39. The upper end of these side walls is provided with an outwardly directed flange 40 the lower surface of which rests adjacent its outer edge upon the upper edges of the side wall of the receptacle 10 and the outer ends of which are provided with a depending flange 41 snugly fitting against the outer wall of the receptacle. This flange 41 has formed therein openings 42 which by rotation of the container support may be aligned with the openings 36 to a greater or lesser degree as desired or may be thrown completely out of alignment with these openings, thus permitting control of the amount of the products of combustion which pass through the openings 36. It will be obvious that such of the products of combustion that do not pass through these openings must pass through the openings 39 of the side walls of the container support. In order that the products of combustion passing through the openings 39 may be directed against the side walls of the container, I provide a cover 43 having a central opening 44 slightly greater in diameter than the container so that the products of combustion in passing from the space between the container cover and the side walls of the container receptacle must pass into engagement with the side walls of the container. The outer edge of this cover plate is preferably provided with a depending flange 45 engaging the outer face of the flange 41 of the container support.

It will be obvious that a burner constructed in accordance with the foregoing may be very cheaply produced and is readily operated and controlled. Particular attention is directed to the fact that, due to the fact that the inner end of the wick 20 is housed and accordingly cannot drop to one side or the other of the casing, if the casing be tipped all danger of explosions or fires caused by tipping of the contents can be eliminated by always seeing that the container is filled to less than one-half of its maximum capacity. If this be done and the container tipped in lying upon its side the oil will not reach the level of the housing 22 and since no fuel is supplied to the wick will rapidly burn out. This is always true in event of complete inversion of the casing and the flange 16 is made of a length slightly greater than one-half of the depth of the casing and is solid.

It will be obvious that the construction hereinbefore set forth is capable of a considerable range of change and modification without materially departing from the spirit of my invention and I accordingly do not limit myself to such specific structure except as hereinafter claimed.

I claim:—

1. In a heater, a cylindrical casing, a heater within the casing at the lower end thereof, a dished receptacle mounted within the casing and having an outstanding flange resting upon the upper surface thereof, said receptacle being provided upon the outer edge of the flange with a depending flange fitting against the outer wall of the casing, said depending flange and the wall of the casing having a plurality of openings formed therein, said receptacle being rotatable to control the alignment of said openings.

2. In a heater, a cylindrical casing, a heater within the casing at the lower end thereof, a dished receptacle mounted within the casing and having an outstanding flange resting upon the upper surface thereof, said receptacle being provided upon the outer edge of the flange with a depending flange fitting against the outer wall of the casing, said depending flange and the wall of the casing having a plurality of openings formed therein, said receptacle being rotatable to control the alignment of said openings, the side walls of said receptacle having openings formed therein, and a cover for said receptacle having a central opening.

3. In a heater, a cylindrical casing, a heater within the casing at the lower end thereof, a dished receptacle mounted within the casing and having an outstanding flange resting upon the upper surface thereof, said receptacle being provided upon the outer edge of the flange with a depending flange fitting against the outer wall of the casing, said depending flange and the wall of the casing having a plurality of openings formed therein, said receptacle being rotatable to control the alignment of said openings, the side walls of said receptacle having openings formed therein, a cover for said receptacle having a central opening, and a container mounted in the receptacle and of less diameter than the central opening of the cover.

4. In a heater, a cylindrical casing, a heater within the casing at the lower end thereof, a dished receptacle mounted within the casing and having an outstanding flange resting upon the upper surface thereof, said receptacle being provided upon the outer edge of the flange with a depending flange fitting against the outer wall of the casing, said depending flange and the wall of the casing having a plurality of openings formed therein, said receptacle being rotatable to control the alignment of said openings, the side walls of said receptacle having openings formed therein, and a cover for said receptacle having a central opening, said heater directing its products of combustion against the lower face of said receptacle and at the center thereof.

In testimony whereof I hereunto affix my signature.

JOHN M. SARGEANT.